(12) United States Patent
Di Prima-Bucci et al.

(10) Patent No.: US 10,485,185 B1
(45) Date of Patent: Nov. 26, 2019

(54) VEGETATION SUPPORT STRUCTURE

(71) Applicants: Angela Di Prima-Bucci, Philadelphia, PA (US); Michael Nelson Bucci, Philadelphia, PA (US)

(72) Inventors: Angela Di Prima-Bucci, Philadelphia, PA (US); Michael Nelson Bucci, Philadelphia, PA (US)

( * ) Notice: Subject to any disclaimer, the term of this patent is extended or adjusted under 35 U.S.C. 154(b) by 144 days.

(21) Appl. No.: 15/612,549

(22) Filed: Jun. 2, 2017

(51) Int. Cl.
*A01G 9/02* (2018.01)
*A01G 9/12* (2006.01)
*A01G 22/00* (2018.01)

(52) U.S. Cl.
CPC ............... *A01G 9/025* (2013.01); *A01G 9/12* (2013.01); *A01G 22/00* (2018.02)

(58) Field of Classification Search
CPC .......... A01G 9/025; A01G 22/00; A01G 9/12
USPC .................................. 47/66.7, 66.5
See application file for complete search history.

(56) References Cited

U.S. PATENT DOCUMENTS

| | | | |
|---|---|---|---|
| 2,121,173 A | 6/1938 | MacPhereson | |
| 3,893,739 A * | 7/1975 | Bernard | A47B 57/585 211/184 |
| 4,295,296 A | 10/1981 | Kinghorn | |
| 5,099,606 A | 3/1992 | Koerper | |
| 5,211,292 A * | 5/1993 | Paolucci | A47B 81/068 108/91 |
| D340,597 S * | 10/1993 | Klock | D6/675.1 |
| 5,373,662 A | 12/1994 | Wickstrom | |
| 5,579,603 A | 12/1996 | Fukuzumi | |
| 6,464,086 B1 * | 10/2002 | Klein | A47B 96/16 211/35 |
| 6,725,601 B2 | 4/2004 | Chick | |

(Continued)

FOREIGN PATENT DOCUMENTS

| | | |
|---|---|---|
| WO | 2010009505 A1 | 1/2010 |
| WO | 2010009505 A8 | 1/2010 |

(Continued)

OTHER PUBLICATIONS

Sale of Green Living tm wall (green wall) on or about Sep. 22, 2015 (Sep. 22, 2015) by MNB Constructs LLC, Arthur Avenue Residence AKA The Sydelle, The Bronx, New York, USA, Submittals of shop drawings attached (GREENWALL15612549.pdf).

(Continued)

*Primary Examiner* — Tien Q Dinh
*Assistant Examiner* — Ebony E Evans
(74) *Attorney, Agent, or Firm* — Stephen G Stanton, Esq.

(57) ABSTRACT

A vegetation support structure including a frame including a back wall, and opposing side walls; a plurality of horizontal support platforms affixed to the opposing side walls at respective opposing ends; a lower horizontal support platform affixed to the opposing side walls at respective opposing ends; a plurality of horizontal support platforms above the lower horizontal support platform affixed to the opposing side walls at respective opposing ends; an upper horizontal support platform affixed to the opposing side walls above the plurality of horizontal support platforms at respective opposing ends; a plurality of vertical interior walls interconnected to the horizontal support platforms to define individual cells between the opposing side walls; and one or more front panels extending up to half of a height of one or more of the respective individual cells.

20 Claims, 5 Drawing Sheets

(56) References Cited

U.S. PATENT DOCUMENTS

| | | | |
|---|---|---|---|
| 7,080,482 | B1 | 7/2006 | Bradley |
| D547,569 | S * | 7/2007 | Yan .................... D6/675.1 |
| 7,243,460 | B2 | 7/2007 | Darlington |
| 7,921,599 | B2 * | 4/2011 | Irwin .................... A01G 9/025 47/66.1 |
| 7,926,224 | B1 | 4/2011 | Koumoudis |
| 8,984,808 | B2 | 3/2015 | Daniels et al. |
| 9,015,991 | B2 | 4/2015 | Heather |
| 9,131,646 | B2 | 9/2015 | Sung |
| 9,210,846 | B2 | 12/2015 | Vanlente |
| 9,226,457 | B2 | 1/2016 | Laurence et al. |
| 2009/0223126 | A1 | 9/2009 | Garner |
| 2011/0146147 | A1 | 6/2011 | Irwin |
| 2011/0225883 | A1 | 9/2011 | Clifford |
| 2012/0017506 | A1 | 1/2012 | Zhao et al. |
| 2014/0000163 | A1 | 1/2014 | Lin |
| 2014/0075840 | A1 | 3/2014 | Gosling et al. |
| 2014/0096446 | A1 | 4/2014 | Daniels et al. |
| 2014/0115959 | A1 | 5/2014 | Carroll |
| 2014/0325907 | A1 | 11/2014 | Meyer |
| 2016/0037733 | A1 | 2/2016 | Baker |

FOREIGN PATENT DOCUMENTS

| | | |
|---|---|---|
| WO | 2012010792 A1 | 1/2012 |
| WO | 2013186406 A1 | 12/2013 |
| WO | 2014145549 A1 | 9/2014 |

OTHER PUBLICATIONS

Ribbon cutting ceremony Jun. 6, 2016 (Jun. 6, 2016) at The Sydelle, The Bronx, New, York, USA; photo of partially constructed green wall attached (15612549TheSydellegreenwall.pdf).

Construction completed of green wall actually installed at The Sydelle, The Bronx, New York, USA, on or about Oct. 5, 2016 (Oct. 5, 2016), pending patent application drawings re green wall actually installed attached (15612549Oct2016.pdf).

Unknown, Living Walls Flexible. Sustanable. Transformational., biotecture sustainable living walls, (c) 2016, Biotecture Ltd., http://www.biotecture.uk.com/living-walls/.

Unkown, Greenwalls Vertical Planting Systems. Embrace the Vertical., (c) 2015, Greenwalls.com, http://greenwalls.com/home/.

M.C. Salas, et al., Hydroponic System for Growing Ground Cover Plants on Vertical Surface, ISHS, ISHS Acta Horticulturae, < Mar. 28, 2016, http://www.actahort.org/books/881/881.

Installation (experimental) VERTÜ™ green wall initially grown (potential experimental use) on or about Nov. 11, 2015 (Nov. 11, 2015) by MNB Constructs LLC, at Cicconi Farms Greenhouse, Jackson, N.J., U.S.A., and then installed (potential experimental use) on or about Dec. 17, 2015 (Dec. 17, 2015) Graham Building, 30 South 15th Street, Philadelphia, USA, 19102 by MNB Constructs LLC; Submittal of photographs (3) of Graham Building installation attached (VERTÜ™ trademark MNB Constructs LLC).

Installation (experimental) VERTÜ™ green wall on or about May 5, 2015, 2015) by MNB Constructs LLC, at 726 South Hutchinson Street, Philadelphia, USA, Submittal of photographs (5) attached (VERTÜ™ trademark MNB Constructs LLC).

* cited by examiner

VEGETATION SUPPORT STRUCTURE

FIELD

The present invention relates to live vegetation support structures/systems that facilitate growth of plants thereon and which may be positioned vertically on interior and exterior walls, or positioned on horizontal and inclined roof structures.

BACKGROUND OF THE INVENTION

The Norse used so-called green roofs to insulate their homes and also to grow their vegetables, herbs and flowers. Such Norse green roofs may have developed due to the lack of natural resources, with the people turning to sod and stone to build their roofs. Currently, vegetation support structures/systems have become useful and desirable for esthetic and environmental purposes in both commercial and residential structures. Vegetation support structures may be used to grow vegetables/produce in urban areas, as well as reducing heat gain in buildings and offsetting $CO_2$ emissions, and may be mounted substantially vertically (as green walls) or substantially horizontally (as green roofs).

Such vegetation support structures come in a variety of specific structures, but, for example, when mounted vertically, the growing medium in many designs is not sufficiently held within the structures, and any conventional growing medium retaining structure can restrain/restrict the growth of the vegetation/plants.

It is an object of the present invention to provide an improved vegetation support structure.

Other objects may appear hereafter.

SUMMARY

The present invention seeks to provide an improved vegetation support structure having a restraining structure feature to retain the growing medium when positioned vertically, for example, and opening structures to facilitate the growth of the roots of the vegetation growing and established on the vegetation support structure.

In one exemplary embodiment of the present invention, a vegetation support structure includes a frame including a back wall, and opposing side walls; a lower horizontal support platform affixed to the opposing side walls at respective opposing ends; a plurality of horizontal support platforms above the lower horizontal support platform affixed to the opposing side walls at respective opposing ends; an upper horizontal support platform affixed to the opposing side walls above the plurality of horizontal support platforms at respective opposing ends; a plurality of vertical interior walls interconnected to the horizontal support platforms to define individual cells between the opposing side walls; and one or more front panels extending up to half of a height of one or more of the respective individual cells.

In another exemplary embodiment of the present invention, a vegetation support structure includes a frame including an back wall, and opposing side walls; a plurality of horizontal support platforms affixed to the opposing side walls at respective opposing ends, the plurality horizontal support platforms having a series of slotted openings; a lower horizontal support platform defining a bottom platform affixed to the opposing side walls below the plurality of horizontal support platforms at respective opposing ends; an upper horizontal support platform affixed to the opposing side walls above the plurality of horizontal support platforms at respective opposing ends; a plurality of vertical interior support walls interconnected to the horizontal support platforms to define a plurality of individual cells between the impervious opposing side walls, the plurality of vertical interior support walls having a plurality of openings to permit intercommunication between adjacent ones of the plurality of individual cells; and a plurality of vertical front panels affixed to at least the opposing side walls and extending up to half of a height of one or more of the individual cells, the plurality of vertical front panels including a plurality of slotted openings exposing at least a portion of each of the plurality of individual cells.

In yet another exemplary embodiment of the present invention, a method of supporting vegetation planted within respective cells of a vegetation support structure, the method includes assembling a vegetation support structure having respective cells defined by a back wall, opposing side walls, vertical support walls, horizontal support platforms, and vertical walls, to define individual cells; affixing front panels over each cell so that the front panels extend from a front bottom edge of each cell up to about half the height of each cell; positioning the vegetation support structure horizontally; adding growing medium into the cells; planting vegetation within the growing medium; adding irritation liquid to the growing medium; and optionally raising the vegetation support structure to a vertical position, wherein the growing medium is retained within the cells during a growing regimen by the respective front panels.

BRIEF DESCRIPTION OF THE DRAWINGS

The present invention will be more clearly understood from the following description taken in conjunction with the accompanying drawings in which like reference numerals designate similar or corresponding elements, regions and portions and in which.

DETAILED DESCRIPTION OF THE PREFERRED EMBODIMENT

The term "about" when referring to a numerical range or value is a convenience and is to be interpreted as, for example, plus or minus 10% of that value or range. For example "from about 100 to 1000" is to be interpreted as within the range of 90 to 1100 and "about 1000" is to be interpreted as from 900 to 1100.

The relative terms vertical and horizontal, for example, in the specification refer to the position of the vegetation support structure when vertically attached on an interior or exterior wall of a building or the like unless otherwise indicated (regardless of whether the vegetation support structure is finally mounted vertically, horizontally, or otherwise). Also, while it is preferred to have the horizontal support platforms sloping downwards towards the back wall, the relative term horizontal is used in describing the horizontal support platforms as compared to the vertical side walls and vertical interior support walls.

The vegetation support structure/system of the present invention may include the following elements/characteristics. The vegetation support structure may be a series of overlapping interconnected perforated panels (e.g., walls and platforms) where irritation water/liquid may migrate by gravity from upper cells to lower cells. The interconnected panels may define a series of semi-open-faced cells in a grid pattern mounted on a liquid impervious back wall, and which may have liquid impervious outermost side walls. The panels may be constructed from coated aluminum sheets to minimize corrosion and be suitable for the growth of edible vegetation/plants. Large round perforations may be defined within at least the internal vertical walls (vertical cell dividers) that may permit and promote plant root migration between adjacent cells, may reduce having root bound vegetation/plants, and may extend the life of individual vegetation/plants. Each cell may have a vertical front face (vertical front panel) extending from the bottom of the cell, and covering up about half of the front face of the cell to retain soil/growing medium that otherwise may erode and fall from the cell as the surface/soil/growing medium dries out through a dry-out cycle between vegetation waterings.

The vertical front panel includes a series of slots/perforations (which may be oriented horizontally), which may assist in aerating the soil/growing medium and which may act as mulch (e.g., in that mulch retains soil moisture and prevents soil erosion) that may retain soil/growing medium moisture. Smaller, secondary, vegetation/plants (e.g. grasses) may also grow through the slots/perforations, which may further fill the front face with vegetation/plants for a fuller appearance of the vegetation support structure. The back panel and outer side walls may be composed of liquid impervious material, and the outer side walls may include perforations to permit root growth between adjacent vegetation support structures. The bottommost horizontal support platform may be inclined/sloped downwardly from front to the rear (adjacent the liquid impervious back wall), which may facilitate easier access to drip irrigation lines and easier removal of an individual panel. The topmost horizontal support platform, the internal horizontal support platforms, and the bottommost horizontal support platform, may each be inclined/sloped downwardly from front to the rear (adjacent the liquid impervious back wall) to direct irrigation water onto and from the top cell of the structure through a series of slots/perforations (which may be oriented horizontally) in the topmost horizontal support platform to the lower cells through slots/perforations (which may be oriented horizontally) in the horizontal support platforms of each lower cell. The slots/perforations in the horizontal support platforms may also facilitate free root migration between adjacent cells.

The horizontal support platforms may include a lip on the trailing (back) edge to facilitate mounting to the back wall. The uppermost and lowermost horizontal support platforms may be mounted to the back wall with, for example, rivets or the like. The lips may also be sealed with water cut-off mastic/structural sealant to retain irrigation water/liquid within the cell to facilitate water/liquid absorption into the soil/growing medium, and to minimize/prevent irrigation water/liquid from running down the face of the back wall. The water cut-off mastic/structural sealant may be sufficient to affix the internal horizontal support platforms to the back wall without the need for rivets or the like. The front face of the uppermost horizontal support platform is exposed so may have a folded edge/lip on the leading (front) edge as a safety feature against potentially sharp metal edges. This may facilitate safe planting, replanting and reaching into cells to add/replace soil/planting medium, or vegetation/plants, into the cells. It is noted that in an exemplary design of the vegetation support structure in accordance with the present invention, the use of the front panels may obviate the need for a leading folded edge/lip on the internal horizontal support platforms and the lowermost horizontal support platform as the front panels may cover these leading edges. The back panel may also have an upper continuous hook/bent ledge for hanging/mounting the vegetation support structure onto a horizontal bar of a vertical wall surface.

Figure 1:
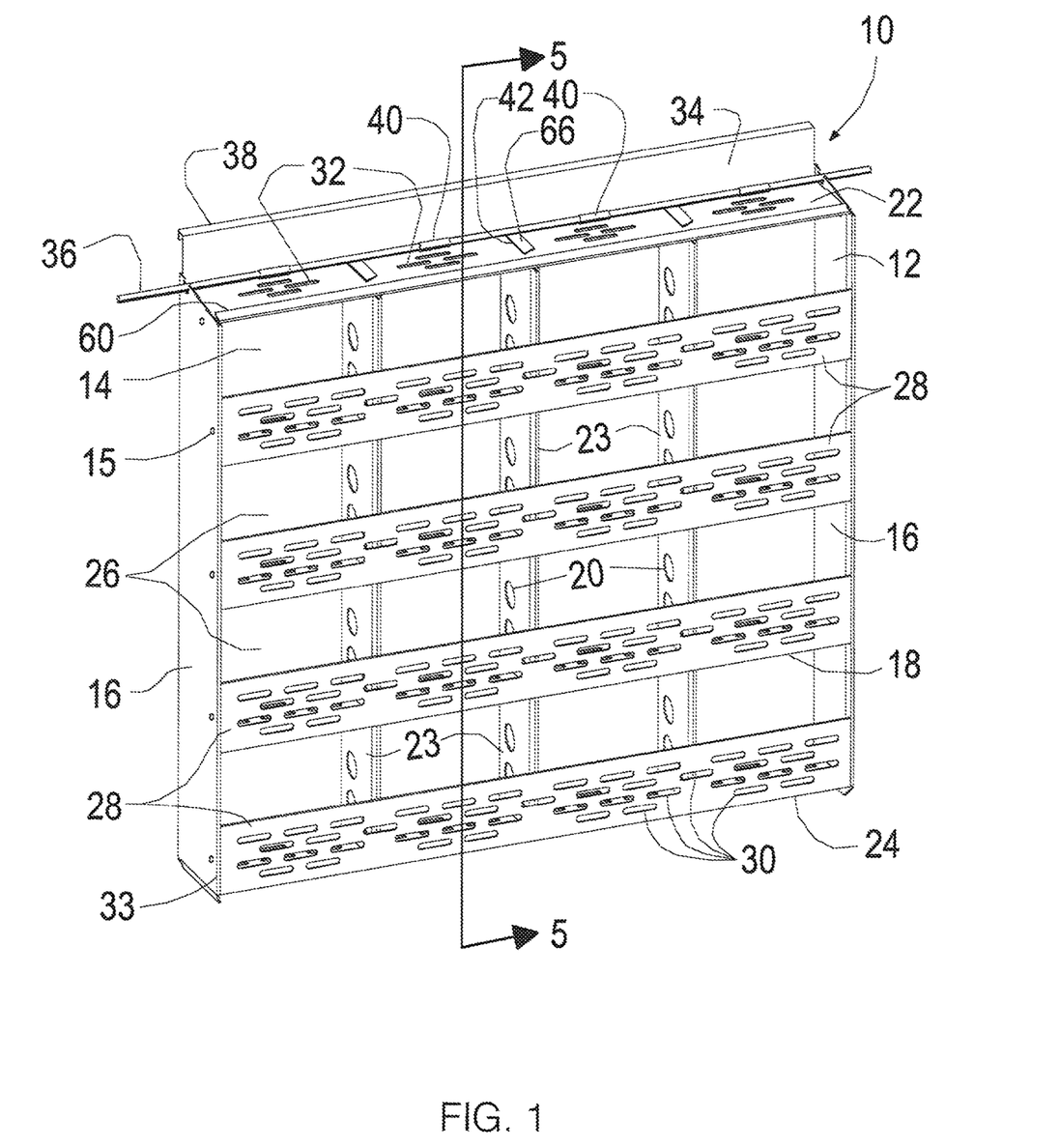
FIG. 1 is a perspective view of a vegetation support structure in accordance with an exemplary embodiment of the present invention.
Figure 2:
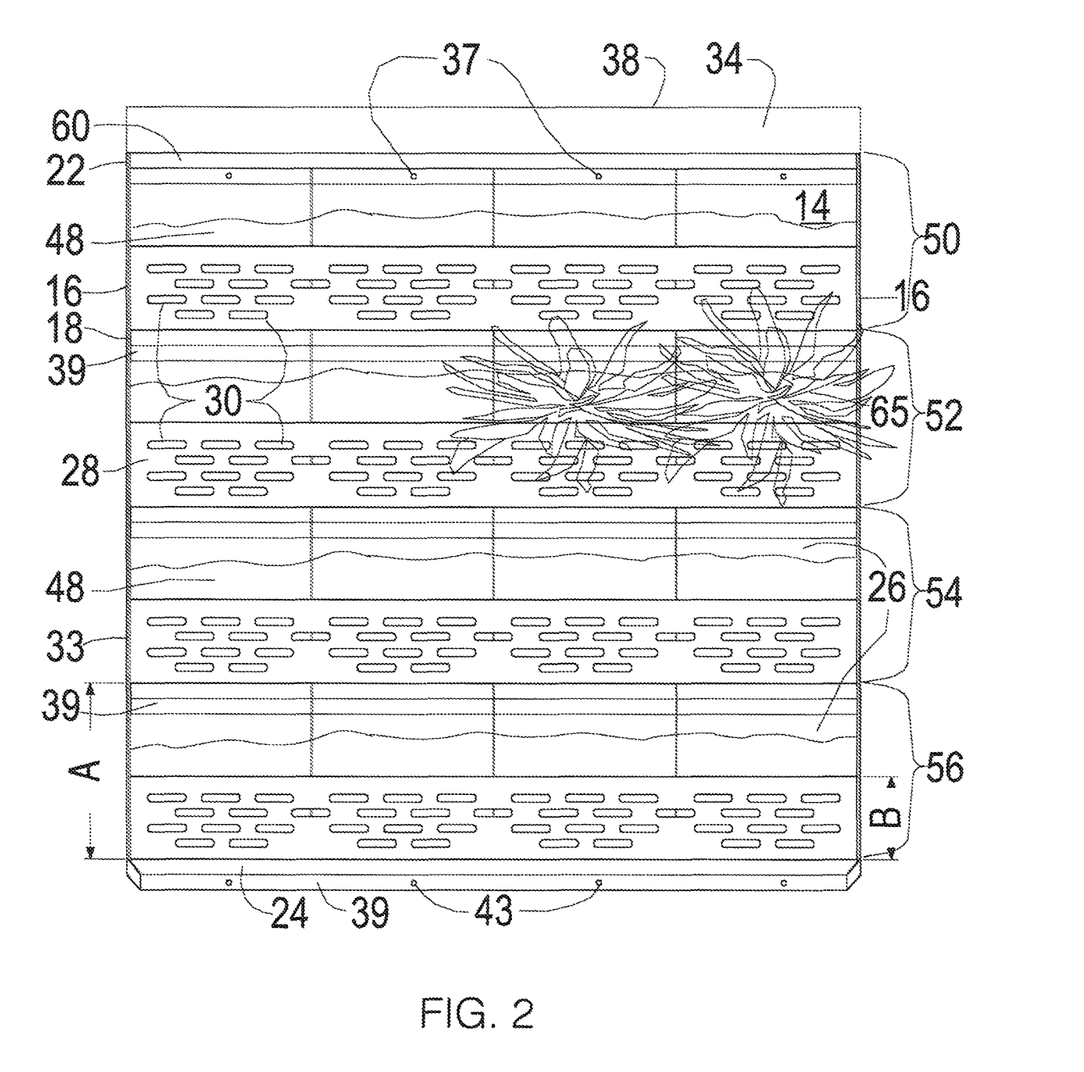
FIG. 2 is a front view of a vegetation support structure in accordance with an exemplary embodiment of the present invention.

Specifically, as illustrated in FIGS. 1 and 2, in accordance with an exemplary embodiment of the present invention, vegetation support structure 10 of the present invention includes (a) frame 12 with liquid impervious back wall 14, (b) opposing outer side walls 16, (c) a plurality of spaced apart internal horizontal support platforms 18 affixed to opposing side walls 16, (d) an uppermost horizontal support platform 22 affixed proximate respective upper portions of opposing outer side walls 16, (e) a lowermost horizontal support platform 24 affixed proximate respective lower portions of opposing outer side walls 16, and (f) a plurality of spaced apart vertical interior support walls 23 (interconnected with horizontal support platforms 18, 22, 24 (see below), and with opposing ends of vertical interior support walls 23 respectively affixed to uppermost horizontal support platform 22, and lowermost horizontal support platform 24) to define individual cells 26 there between. Vegetation support structure 10 may be about 24 inches wide by 24 inches high, but may also be produced in custom sizes such as, for example, 24 inches by 12 inches, 12 inches by 12 inches.

A plurality of front panels 28 overlie respective rows 50, 52, 54, 56 (e.g., see FIG. 2) of cells 26 between opposing side walls 16, and each extend a height "B" up to about half of a height a height "A" of each row of cells 26. The front panels 28, and spaced apart horizontal support platforms 18, 22, 24 each include a series of respective elongated horizontal elongated slots/apertures 30, 32, and vertical interior support walls 23 include a series of oval or circular apertures 20. Apertures 20 are sized to facilitate growth of plant roots therethrough between respective adjacent cells 26. Apertures 30, 32 may have a width of from about 1¼ inches to 1⅜ inches, and a height of from about ¼ inches to ⅜ inches. Oval/circular apertures 20 may have a circular radius of from 7/16 inches to 9/16 inches, or an oval height of from about ⅞ inches to 1⅛ inches and an oval width of from about ⅞ inches to 1¼ inches. Front panels 28 include tabs 31 (e.g., also see FIG. 5) at their respective ends which abut respective outer side walls 16 with rivets 15 fastening front panels 28 to outer side walls 16 through tabs 31. Vertical interior support walls 23 include tabs 66 at their upper ends that inter engage with corresponding slots 42 of uppermost vertical platform 22 (e.g., also see FIG. 3).

Portion 34 of back wall 14 extends above uppermost horizontal support platform 22 and includes hook/bent ledge 38 (e.g., also see FIG. 5) at its upper backside for mounting vegetation support structure 10 vertically onto a relevant structure on an interior or exterior wall of a building or the like, for example. As shown, frame side walls 16 each include a leading/front folded edge 33 to avoid otherwise having an exposed sharp edge. Irrigation water hose 36 is positioned on uppermost horizontal support platform 22 proximate back wall portion 34 with spaced irrigation emitters 40. Such an arrangement permits irrigation liquid to pass from spaced irrigation emitters 40 through, for example, elongated slots 32 of uppermost horizontal support platform 22 at a controlled rate, and thereafter drip unto growing medium 48 (e.g., see FIG. 2) within uppermost cells 26 in row 50 and then to each cell 26 there below in turn, that is, rows 52, 54, 56 of cells 26. Any remaining irrigation liquid may then drip through elongated slots 32 of lowermost horizontal support platform 24 (e.g., see FIG. 4) and exit vegetation support structure 10. If another vegetation support structure (not shown) is mounted below vegetation support structure 10 then the remaining irrigation liquid may drip from lowermost horizontal support platform 24 and unto the uppermost horizontal support platform of the lower vegetation support structure, and then to the cells there below of the lower vegetation support structure, if not, the excess irrigation water/liquid may be collected in a drip pan (not shown) and recycled or disposed of as necessary (noting that any lower vegetation support structures may each include respective irrigation water hoses and respective spaced irrigation emitters 40).

Vertical front panels 28 are mounted on frame side walls 16 (e.g., by a tab 31/rivet 15 (e.g., also see FIG. 5) inter-engagement discussed above). Vertical front panels 28 extend from a bottom of each cell 26 (e.g., from the leading edge of lowermost horizontal support platform 24/internal horizontal support platforms 18) in rows 50, 52, 54, 56 of cells 26, up to height "A" of about half a height "B" of each cell 26. For example, for a cell having a height "A" of 5¾ inches and width of about 5⅞ inches, front panel 28 would extend up to a height "B'" of about 2⅞ inches, or about 2¾ inches of the face of each cell 26. Vertical front panels 28 include a series of elongated slots 30 and when growing medium 48 (e.g., see FIG. 2) is placed within cells 26 (e.g., by inserting growing medium 48 above front panels 28 and into cells 26), and the vegetation support structure 10 is mounted vertically on a wall or the like, front panels 28 may allow retention of additional growing medium 48 within cells 26 (as compared to many conventional designs) as vertical front panels 28 retain more growing medium 48 per each cell 26 that would otherwise erode and fall from each cell 26. For example placing vegetation support structure 10 in a substantially vertical position, medium 48 surface may dry out through, for example, a dry-out cycle between vegetation waterings. Further, as noted above, horizontal elongated slots/perforations 30, and the arrangement of horizontal elongated slots/perforations 30, assist in aerating growing medium 48 and may act as mulch in that slots 30 may facilitate retention of growing medium moisture and prevents erosion of growing medium 48.

Vertical front panels 28 permit free access into cells 26, and the upper edge of front panels 28 may have a folded edge, or the like, to avoid any potentially sharp metal edges. Horizontal support platform 22 also includes lip 60 along the front or leading edge to avoid otherwise having an exposed sharp edge (e.g., see uppermost horizontal support platform 22 in FIG. 1). Vegetation 65 (e.g., see FIG. 2) may be planted within each cell 26 by reaching above/over respective front panels 28. Such principal, larger vegetation 65 grows above each front panel 28 of each cell 26, and small, secondary, vegetation/plants (e.g., grasses) (not shown) may also grow through horizontal slots 30 which may then further fill the front face with vegetation/plants for a fuller appearance of vegetation support structure 10. As illustrated in FIG. 2, for example, horizontal support platforms 18, 22, 24 slope downwardly from vertical front panels 28 towards back wall 14, and each may include optional lip 39 that abuts back wall 14, with uppermost and lowermost horizontal support platforms 22, 24 may be affixed to back wall 14 using rivets 37, 43, for example (e.g., see FIG. 5). In rows 50, 52, 54, internal horizontal support platforms 18 may be affixed to back wall 14 using water cut-off mastic/structural sealant 41 (e.g., see FIG. 5). It is noted that internal horizontal support platforms 18 may also be alternatively mounted to back wall 14 using rivets or the like as used with the uppermost and lowermost horizontal support platforms 22, 24.

Figure 3:
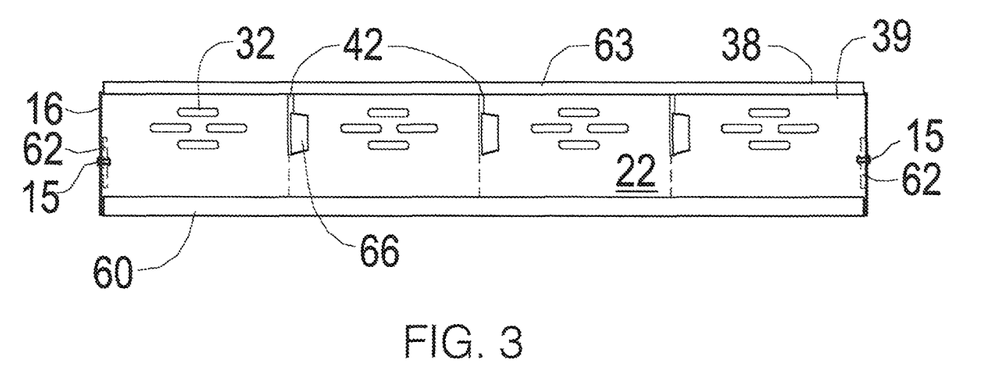
FIG. 3 is a top plan view of a vegetation support structure in accordance with an exemplary embodiment of the present invention.

As illustrated in FIG. 3, in accordance with an exemplary embodiment of the present invention, in a top plan view, uppermost horizontal support platform 22 includes elongated slot apertures 32, and side connecting tabs 62 abutting vertical outer side walls 16. Rivets 15 fasten uppermost horizontal support platform 22 to outer side walls 16 through tabs 62. Uppermost horizontal support platform 22 also includes lip 60 along the front or leading edge to avoid otherwise having an exposed sharp edge. Trailing edge 63 of uppermost horizontal support platform 22 proximate back wall 14 may include optional lip 39 that abuts back wall 14 with rivets 37 (neither shown, but see, e.g., FIGS. 2 and 5) fastening uppermost horizontal support platform 22 to back wall 14 through lip 39. Lips 39 may also be sealed with water cut-off mastic/structural sealant 41 (not shown, but see, e.g., FIG. 5), or the like, to retain irrigation water/liquid within the respective cells to facilitate water/liquid absorption into the soil/growing medium 48, and to minimize/prevent irrigation water/liquid from running down the face of the back wall. Uppermost horizontal support platform 22 further includes engagement slots (not shown) adapted to receive tabs 66 at the upper edge of vertical internal support walls 23 (e.g., see FIG. 5). Back wall 14 also includes hook/bent ledge 38 (e.g., also see FIGS. 1 and 5) for the mounting of vegetation support structure 10 to, for example, a vertical interior or exterior wall of a building or the like (not shown).

Figure 4:
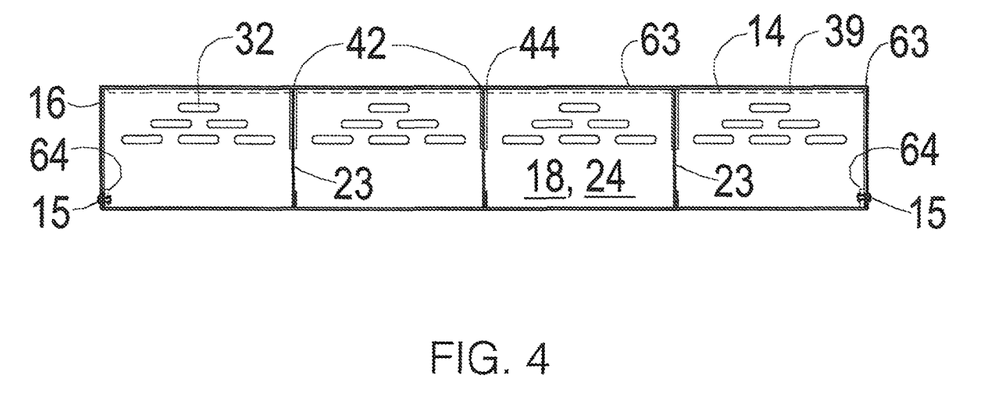
FIG. 4 is a top plan view of an internal horizontal support platform/lowermost horizontal support platform in accordance with an exemplary embodiment of the present invention.

As illustrated in FIG. 4, in accordance with an exemplary embodiment of the present invention, in a top plan view, internal horizontal support platforms 18, and lowermost horizontal support platform 24, each include elongated slot apertures 32, side connecting tabs 64 (that may be about ½" long) that abut outer side walls 16, and are affixed to respective outer side walls 16 using rivets 15, for example. Engagement slots 42 inter-engage with engagement slots 44 of vertical interior support walls 23. A front, or leading, edge lip (e.g., see lip 60 of uppermost horizontal support platform 22 in FIG. 3) may not be necessary for the internal horizontal support platforms 18, and lowermost horizontal support platform 24, as vertical front panels 28 (not shown, but see, e.g., FIG. 1) overlie and cover their respective front edges (e.g., see FIGS. 1-2). Trailing edge 63 of lowermost horizontal support platform 24/internal horizontal support platforms 18 proximate back wall 14 may include optional respective lips 39 for the mounting of respective lowermost horizontal support platform 24/internal horizontal support platforms 18 to back wall 14. Respective lips 39 of internal horizontal support platforms 18 abut back wall 14, and internal horizontal support platforms 18 are affixed to back wall 14 using water cut-off mastic/structural sealant 41 (e.g., see FIG. 5). Rivets 43, or the like, affix lowermost horizontal support platform 24 to back wall 14, and rivets 37, or the like, affix uppermost horizontal support platform 22 to back wall 14 (not shown, but see, e.g., see FIGS. 3 and 5). Lips 39 sealed with water cut-off mastic/structural sealant 41 (not shown) or the like, may tend to retain irrigation water/liquid within the respective cells to facilitate water/liquid absorption into the soil/growing medium 48 (not shown), and to minimize/prevent irrigation water/liquid from running down the face of back wall 14 (e.g., see FIG. 5). Lips 39 of lowermost and uppermost horizontal support platforms 24, 22 may also be sealed with water cut-off mastic/structural sealant (e.g., see FIG. 5).

Figure 5:
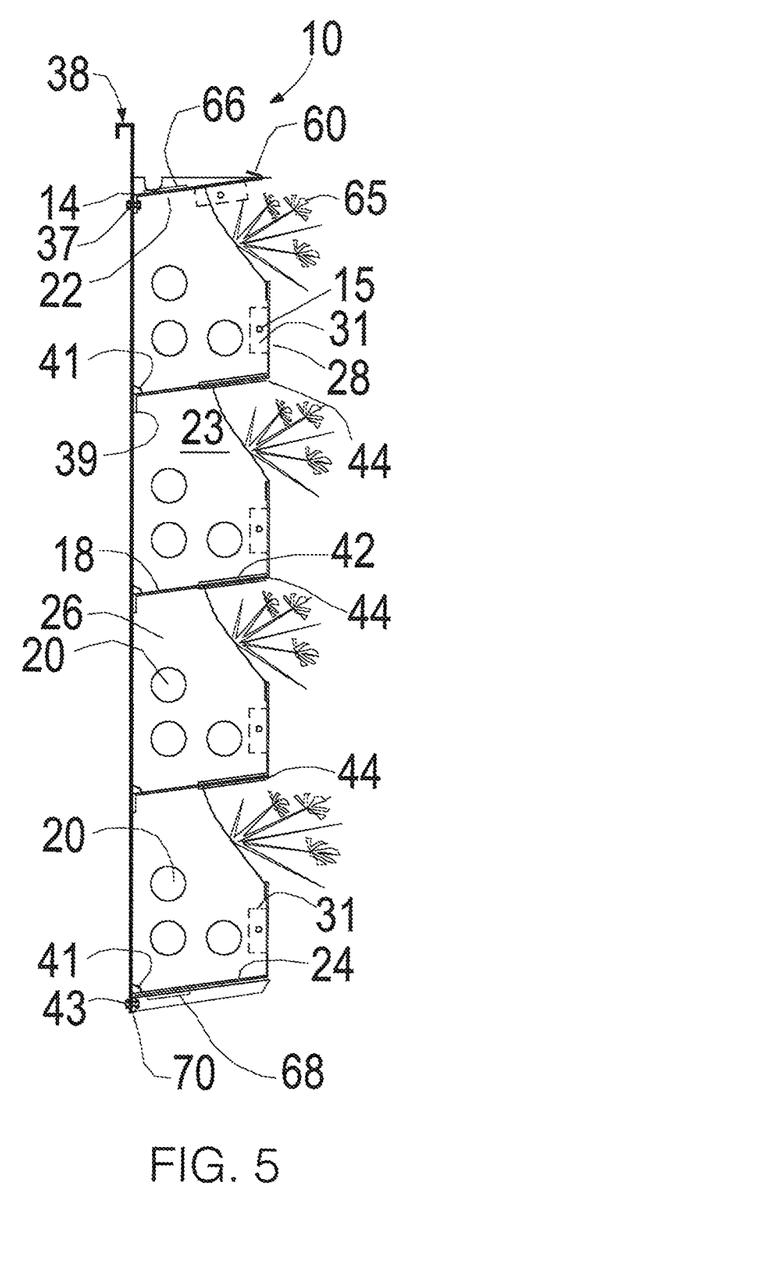
FIG. 5 is sectional side view of a vegetation support structure taken along line 5-5 in FIG. 1 in accordance with an exemplary embodiment of the present invention.

As illustrated in FIG. 5 (taken along line 5-5 in FIG. 1), in accordance with an exemplary embodiment of the present invention, a side sectional view of vegetation support structure 10, vertical interior support wall 23 is inter-engaged with uppermost, internal, and lowermost horizontal support platforms 22, 18, 24, and abuts impervious back wall 14. Back wall 14 includes hook/bent ledge 38 along its upper edge and adapted to hang, or mount, the vegetation support structure 10 to a vertical wall or the like (not shown). Lower edge 70 of back wall 14 extends beneath lowermost horizontal support platform 24 as illustrated. As shown, uppermost and lowermost horizontal support platforms 22, 24 and internal horizontal support platforms 18 each slope from front to back towards back wall 14 to facilitate drainage of excess irrigation liquid through slotted apertures 32 (not shown, but, e.g., see FIGS. 3-4). Vertical interior support wall 23 includes engagement slots 44 for inter-engagement with respective slots 42 of internal horizontal support platforms 18 that, with outer side walls 16 (not shown, but, see, e.g., FIG. 1) and, with uppermost horizontal support platform 22, lowermost horizontal support platform 24, and back wall 14, define cells 26. Upper tabs 66 engage within slots of uppermost horizontal support platform 22, while lower tabs 68 engage within slots of lowermost horizontal support platform 24 (also see, e.g., FIGS. 3-4). Front panels 28 each include tabs 31 (shown in dashed lines in FIG. 5 and see, e.g., FIG. 6) at opposing ends that abut respective outer side walls 16, and are affixed to respective outer side walls 16 using rivets 43 inserted into respective slots (not shown) in side walls 16 (not shown, but see, for example, FIG. 6). Uppermost horizontal support platform 22 includes lip 60 at its leading edge that may avoid a sharp edge. Respective lips 39 on the trailing edges of uppermost and lowermost horizontal support platforms 22, and 24 secure uppermost and lowermost horizontal support platforms 22, and 24 to back wall 14 using rivets 37, 43, for example. Internal horizontal support platforms 18 are secured to back wall 14 by water cut-off mastic/structural sealant 41 as illustrated (or may be alternatively mounted to back wall 14 using rivets or the like). Water cut-off mastic/structural sealant 41 may also seal lips 39 of uppermost and lowermost horizontal support platforms 22, and 24 against back wall 14. The root system of vegetation 65 may grow between adjacent cells 26 in each row 50, 52, 54, 56 though the arrangement of oval/round apertures 20 which may also reduce root bound vegetation. It is noted that, for example, sealant 41 may not be used in each cell, for example, not used in lowermost cell 56, and/or sealant 41 may (also) be used at the junction of uppermost horizontal support platform 18 and back wall 14. Sealant 41 may also be placed over rivets 37, 43 to minimize any leakage and/or to protect rivets 37, 43 from the elements/irrigation water/liquid.

Figure 6:
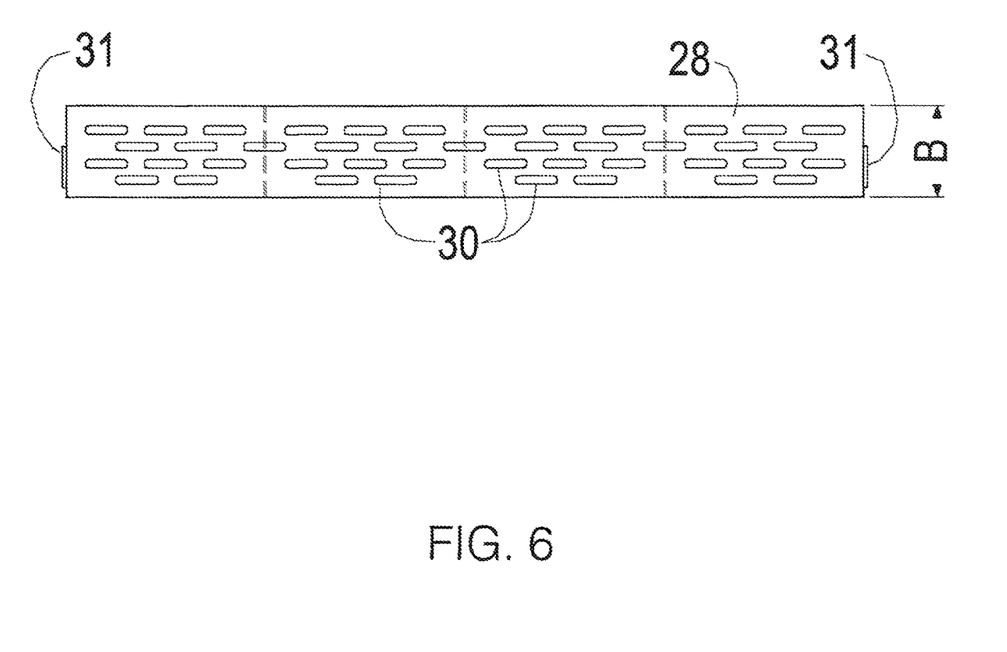
FIG. 6 is front elevation view of a vertical front panel of a vegetative support structure in accordance with an exemplary embodiment of the present invention.

As illustrated in FIG. 6, in accordance with an exemplary embodiment of the present invention, in a front elevation view, vertical front panels 28 each include a series of elongated slot apertures 30, and optional side connecting tabs 31 for abutment, and attachment to, outer side walls 16 using, for example, rivets 15 (neither shown but see, e.g., see FIG. 1). Height "B" of front panels 28 is about half of height "A" of corresponding cells 26 in a particular row 50, 52, 54, 56 (not shown but see, e.g., see FIG. 2). For example, height "B" may be about 2⅞" inches, or about 2¾" for a cell height of about of 5¾" inches. As noted above, the presence of front panels 28 may retain more of the growing medium when the vegetation support structure is raised to a vertical position, and may retain soil/growing medium that otherwise could erode and fall from the cells 26 as the surface dries out through a dry-out cycle between vegetation waterings (see, e.g., FIG. 2). Further, elongated horizontal slots 30, and the arrangement of elongated horizontal slots 30, may assist in aerating the soil/growing medium and which may act as mulch to retain soil/growing medium moisture by assisting in retaining soil moisture and reducing/preventing soil erosion that would otherwise be expected to occur. Smaller, secondary, vegetation/plants (e.g. grasses) may also grow through horizontal slots 30 which may further fill the front face with vegetation/plants for a fuller appearance of the vegetation support structure.

While certain structures have been illustrated herein for the interconnection between the structural elements of vegetation support structure 10, other structures/methods are contemplated such as, for example, rivets, bolts, screws, welding, etc. For example, tabs and slots may be used to construct vegetation support structure 10 and may be soldered or welded, and welding may be used to construct vegetation support structure 10. The sizes and numbers of cells 50-56 per vegetation support structure 10 may vary depending upon, for example: the use envisioned for vegetation support structure 10; the type and/or amount of vegetation 65 to be used/desired; the specific type of soil/growing medium 48 to be used; the intended use/placement of vegetation support structure 10; and the climate within which the vegetation support structure 10 is to be used.

A method of supporting vegetation planted within a vegetation support structure in accordance with an exemplary embodiment of the present invention includes the following steps (for example, see FIGS. 1-5). It is noted that the following steps may be in a differing order than described, and some steps may be omitted. A series of vertical internal support walls 23 are inter-engaged with a corresponding series of horizontal support platforms 18 and with an uppermost horizontal support platform 22 and a lowermost horizontal support platform 24 to form an inchoate cell structure with inchoate cells. Horizontal support platforms 18, uppermost horizontal support platform 22 and a lowermost horizontal support platform 24 are each assembled in a sloping fashion relative to a horizontal axis that is perpendicular to a vertical axis of vertical internal support walls 23. Corresponding vertical internal support walls 23 and horizontal support platforms 18 inter-engage through corresponding engaging slots 42, 44. Upper tabs 66 on vertical internal support walls 23 engage corresponding slots 42 in uppermost horizontal support platform 22, and lower tabs 68 on vertical internal support walls 23 engage corresponding slots 42 in lowermost horizontal support platform 24. Back wall 14 is aligned and inter-engaged to the inchoate cell structure using, for example, lips 39 on the respective trailing edges of horizontal support platforms 18, lowermost horizontal support platform 24, and lip (not shown) on trailing edge 63 of uppermost horizontal support platform 22, to abut back wall 14 with rivets 37, 43 fastening them to back wall 14 through lips 39, 43. Vertical front panels 28 are connected to outer vertical side walls 16 using rivets 15 fastening front panels 28 to outer side walls 16 through tabs 31 of front panels 28. Uppermost vertical platform 22 is also connected to outer vertical side walls 16 using rivets 15 through a tab of platform 22 (for example, see FIGS. 1 and 5). This completes inchoate cells into cells 26. Water cut-off mastic/structural sealant 41 may be sufficient to affix internal horizontal support platforms 18 to back wall 14 without the need for rivets or the like.

With vegetation support structure 10 laying flat on a surface so that back wall 14 is horizontal to the ground, growing medium 48 is placed within cells 26. Growing medium 48 may then be wetted with irrigation water/liquid to moisten growing medium 48. Irrigation water/liquid hose 36 may then be positioned proximate lip 39 in the uppermost horizontal support platform and retained using, for example, fastening tabs 40 (for example see FIGS. 1 and 5). Vegetation support structure 10 may then be positioned and hung substantially vertically to an interior or exterior wall, or the like, of a building, for example, using hook/bent ledge 38. Pointedly, moistened growing medium 48 is tends to be retained within cells 26 by the positioning and size of front panels 28. Vegetation 65 may then be planted within cells 26 over the top edge of front panels 28 so that vegetation 65 will grow through the gap between front panels 28 and the next upper layer of horizontal support platforms 18/uppermost horizontal support platform 22. It is pointedly noted that elongated slots/apertures 30 within front panels 28 may assist in aerating growing medium 48 and may act as mulch to retain growing medium 18. Pointedly, the root system of vegetation 65 may grow between adjacent cells 26 in each row 50, 52, 54, and 56 though oval/round apertures 20 which may also reduce root bound vegetation. Smaller vegetation, e.g., grasses, may grown through elongated slots 30 in front panels 28 to further fill the front face of vegetation support structure 10 for a fuller appearance. horizontal support platforms 18, and lowermost horizontal support platform 24

Additional vegetation support structures 10 may be positioned adjacent other vegetation support structures 10, either side by side, and/or an over/under arrangement. If adjacent vegetation support structures 10 are so positioned, adjacent side walls 16 between them may also include oval apertures 20 for lateral root growth as described above.

As noted above, the platforms/side walls/walls, etc., comprising the vegetation support structure may be constructed from coated aluminum sheets, for example, to minimize corrosion and be suitable for the growth of edible vegetation/plants. Also other attachment structures/methods may be used to assemble the vegetation support structure.

While particular embodiments of the present invention have been illustrated and described, it is not intended to limit the invention, and obvious modifications and equivalents are contemplated that fall within the scope of the following claims. The features of the invention expressed in the following claims may be arranged in any combination and in any order within the purview of the following claims.

We claim:

1. A vegetation support structure comprising:
   a frame including a back wall, and opposing side walls;
   a lower horizontal support platform affixed to the opposing side walls at respective opposing ends;
   a plurality of horizontal support platforms above the lower horizontal support platform affixed to the opposing side walls at respective opposing ends;
   an upper horizontal support platform affixed to the opposing side walls above the plurality of horizontal support platforms at respective opposing ends;
   a plurality of vertical interior walls interconnected to the horizontal support platforms to define individual cells between the opposing side walls; respective lips on trailing edges of the plurality of horizontal support platforms contacting portions of the back wall; sealant overlying the contacted portions of the back wall at least proximate the respective lips; and
   one or more front panels extending to about half of a height of one or more of the respective individual cells.

2. The vegetation support structure of claim 1 wherein the one or more respective cells are configured to include growing medium therein retained by the one or more front panels.

3. The vegetation support structure of claim 2 wherein live vegetation planted in the growing medium within the one or more respective cells is accessible over a top edge of the one or more horizontal front panels.

4. The vegetation support structure of claim 1 wherein the back wall and the opposing side walls are impervious to liquid.

5. The vegetation support structure of claim 1 wherein the horizontal support platforms each include a series of elongated apertures.

6. The vegetation support structure of claim 1 wherein the one or more panels each include a series of elongated apertures.

7. The vegetation support structure of claim 1 wherein the plurality of interior support walls each include a plurality of oval apertures.

8. The vegetation support structure of claim 7 wherein at least some of the oval apertures between adjacent cells are configured to have roots of vegetation planted in the cells extend there through.

9. The vegetation support structure of claim 1 wherein each of the individual cells has a height of about 5¾ inches and the one or more front panels each has a height of from about 2⅞ inches to 2¾ inches.

10. A vegetation support structure comprising:
    a frame including a back wall, and opposing side walls;
    a plurality of horizontal support platforms affixed to the opposing side walls at respective opposing ends, the plurality horizontal support platforms having a series of slotted openings;
    respective lips on trailing edges of the plurality of horizontal support platforms contacting portions; of the back wall;
    sealant overlying the contacted portions of the back wall at least proximate the respective lips;
    a lower horizontal support platform defining a bottom platform affixed to the opposing side wall below the plurality of horizontal support platforms at respective opposing ends;
    an upper horizontal support platform affixed to the opposing side walls above the plurality of horizontal support platforms at respective opposing ends;
    a plurality of vertical interior support walls, generally parallel to the opposing side walls, interconnected to the horizontal support platforms to define a plurality of individual cells between the opposing side walls, the plurality of vertical interior support walls having a plurality of opening to permit intercommunication between adjacent ones of the plurality of individual cells; and
    a plurality of vertical front panels affixed to at least the opposing side walls and extending up to half of a height of one or more of the individual cells, the plurality of vertical front panels including a plurality of slotted openings exposing at least a portion of each of the plurality of individual cells.

11. The vegetation support structure of claim 10 wherein the plurality of vertical front panels prevent excess drainage of any growing medium placed within the individual cells to facilitate growth of vegetation planted in the growing medium.

12. The vegetation support structure of claim 11 wherein the bottom platform includes a series of slotted openings to facilitate drainage of any growing medium placed within the individual cells out of the vegetation support system.

13. The vegetation support structure of claim 10 wherein the back wall includes an upper hanger portion to permit hanging of the vegetation support system on a substantially vertical wall structure.

14. The vegetation support structure of claim 10 wherein the slotted openings have a width of about 1¾ inches and a height of about ¼ inches, and the plurality of openings in the vertical interior support walls are oval with a radius of about 7/16 inches.

15. The vegetation support structure of claim 10 wherein the back wall and side walls are impervious to liquid.

16. The vegetation support structure of claim 10 wherein the individual cells each has a height of about 5¾ inches and the one or more front panels each has a height of from about 2⅞ inches to 2¾ inches.

17. A method of supporting vegetation planted within respective cells of a vegetation support structure, the method comprising:
   a) using an assembled vegetation support structure having respective cells defined by a back wall, opposing side walls, vertical support walls generally parallel to, and between, the opposing side walls, horizontal support platforms, and front panels, generally perpendicular to the opposing side walls, over each row of cells so that the front panels extend from a front bottom edge of each cell to about half a height of each cell, respective lips on trailing edges of the plurality of horizontal support platforms contacting portions; of the back wall; and sealant overlying the contacted portions of the back wall at least proximate the respective lips;
   b) positioning the vegetation support structure horizontally;
   c) adding growing medium into the cells;
   d) planting vegetation within the growing medium;
   e) adding irrigation liquid to the growing medium; and
   f) raising the vegetation support structure to a vertical position,
   wherein the growing medium is retained within the cells during a growing regimen by the respective front panels.

18. The method of claim 17 further comprising:
   forming a series of elongated apertures in a front face of each vertical front panel, wherein the elongated vertical front panel apertures mulch the growing medium in the respective cells.

19. The method of claim 17 further comprising:
   forming a series of oval apertures within the vertical support walls, wherein roots from the vegetation grown through the oval vertical support wall apertures into adjacent cells.

20. The method of claim 17 wherein the height of each cell is about 5¾ inches and each of the front panels has a height of from about 2⅞ inches to 2¾ inches.

* * * * *

UNITED STATES PATENT AND TRADEMARK OFFICE
CERTIFICATE OF CORRECTION

| | | |
|---|---|---|
| PATENT NO. | : 10,485,185 B1 | Page 1 of 1 |
| APPLICATION NO. | : 15/612549 | |
| DATED | : November 26, 2019 | |
| INVENTOR(S) | : Angela De Prima-Bucci and Michael Nelsen Bucci | |

It is certified that error appears in the above-identified patent and that said Letters Patent is hereby corrected as shown below:

In the Specification

Column 9, Line 35, add a "." after "...horizontal support platform 24".

In the Claims

Column 10, Lines 1 - 3, subindent the claimed limitation beginning with "respective lips on" and ending "of the back wall".

Column 10, Lines 3 - 5, subindent the claimed limitation beginning with "sealant" and ending "the respective lips; and".

Column 10, Line 40, insert --of-- between the words "plurality" and "horizontal support".

Column 10, Line 43, delete the ";" between "contacting portions" and "of the back wall;".

Column 10, Line 59, replace the word "opening" with the word --openings--.

Column 12, Line 5, delete the ";" between "contacting portions" and "of the back wall;".

Signed and Sealed this
Fifth Day of May, 2020

Andrei Iancu
*Director of the United States Patent and Trademark Office*